Nov. 17, 1931.　　　D. G. WERNER　　　1,832,517

MAIL SEPARATING AND DISTRIBUTING MACHINE

Filed Jan. 18, 1930　　　3 Sheets-Sheet 1

INVENTOR,
Dick G. Werner.
BY Hovey & Hamilton
ATTORNEYS.

Nov. 17, 1931.    D. G. WERNER    1,832,517
MAIL SEPARATING AND DISTRIBUTING MACHINE
Filed Jan. 18, 1930    3 Sheets-Sheet 2
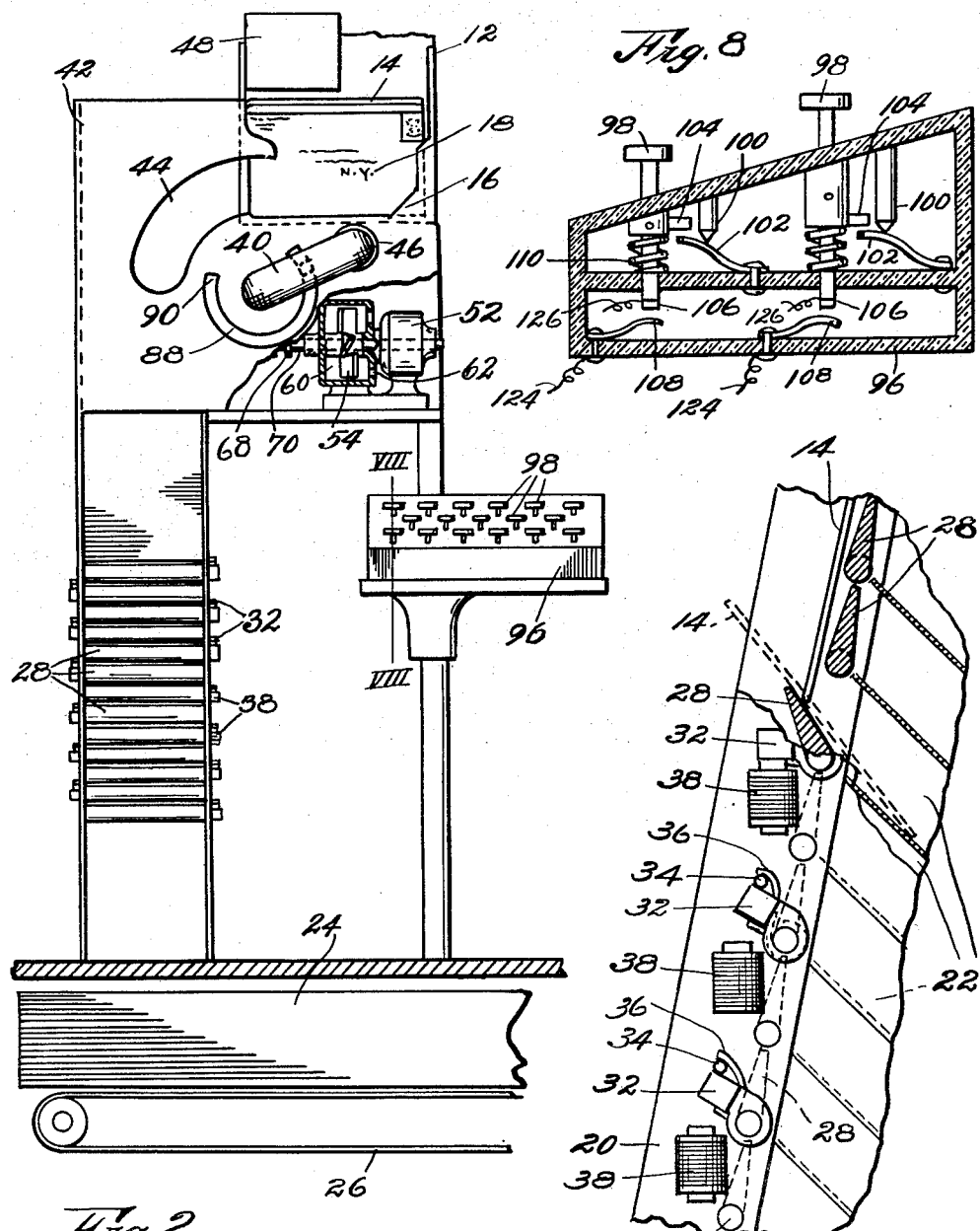
INVENTOR,
Dick G. Werner.
BY
Hovey & Hamilton
ATTORNEYS.

Nov. 17, 1931.    D. G. WERNER    1,832,517
MAIL SEPARATING AND DISTRIBUTING MACHINE
Filed Jan. 18, 1930    3 Sheets-Sheet 3
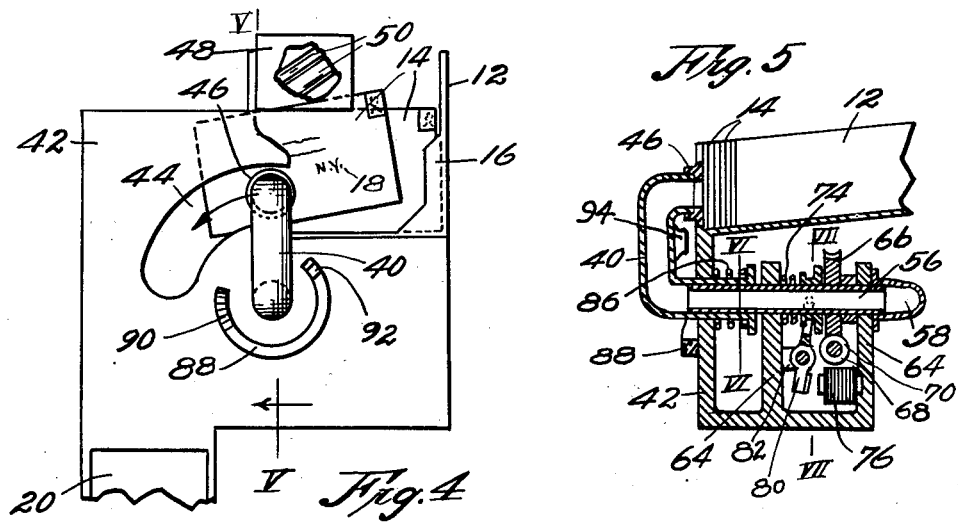
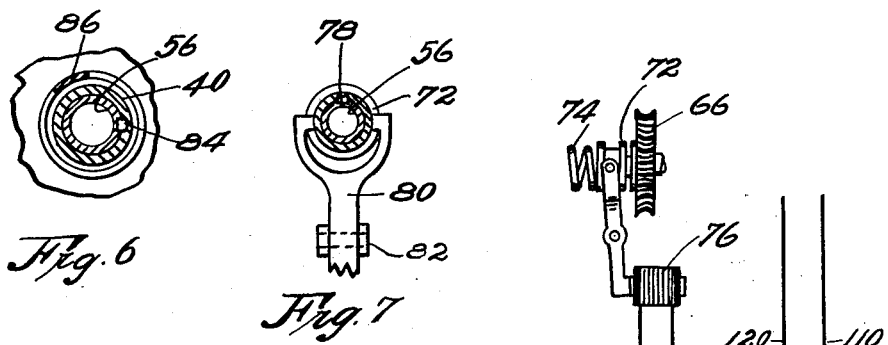
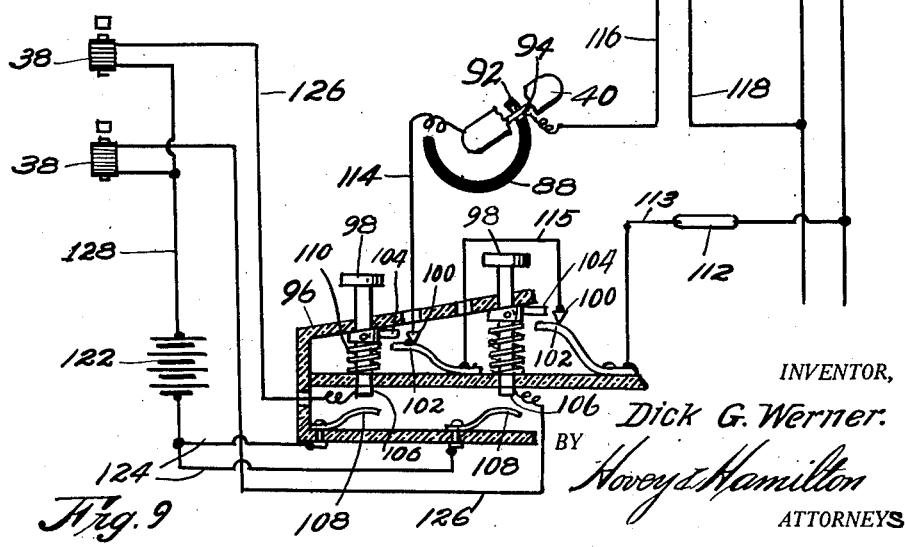
INVENTOR,
Dick G. Werner.
BY
Hovey & Hamilton
ATTORNEYS Patented Nov. 17 1931

1,832,517

UNITED STATES PATENT OFFICE

DICK G. WERNER, OF KANSAS CITY, MISSOURI

MAIL SEPARATING AND DISTRIBUTING MACHINE

Application filed January 18, 1930. Serial No. 421,804.

This invention relates to separating and distributing machines especially adapted for use in separating mail or other units, each of which may be caused to enter any one of a number of predetermined passages for the purpose of dividing the units into groups of a kind.

One of the primary objects of this invention is to provide a separating and distributing machine which performs a maximum amount of work with a minimum number of parts, said parts and elements of the machine being combined in a manner which presents an efficient machine without a large number of intricate mechanical structures.

One of the primary objects of the present invention is to provide a separating and distributing machine having a pair of mail carrying members both adapted to have the units to be distributed, passed there-along by gravity, said members having a novel means for transferring the units to be separated from one carrying member to the other.

A yet further object of this invention is to provide a mail separating and distributing machine which includes common means for actuating a transferring member as well as to cause a suction to be set up at the mouth of said member, the common means having apparatus for disconnecting the same from the transferring member without cutting off or effecting in any way the suction which it maintains.

An even further object of my invention is to provide a novel rotating nozzle which is adapted to move abruptly toward and from the units to be carried when a predetermined position has been reached.

A still further object of the present invention is the provision of a novel chute for units to be separated which has a plurality of passages leading therefrom, said passages each being provided with specially constructed gates remotely operated to move the same to the open position to permit a letter or the like to enter any one of the passages, said gates of all the passages co-operating to form one wall of the chute along which the unit to be distributed is caused to pass by the action of gravity.

A further object of the invention is to provide in a mail separating and distributing machine, simple and effective operating means for the various movable parts thereof which includes a manually operable switchboard, having a plurality of keys each of which acts to open or close switches to energize or de-energize solenoids positioned to actuate various parts of the machine.

It is well known in this art that machines for performing the duty of separating and distributing mail units are extremely complicated, expensive to manufacture, and include a large number of intricate parts which are likely to get out of order. It is also well known that the use of separators over an endless belt to expedite the handling of mail or similar units to be separated, is common and that the machines utilized for primarily separating and distributing the mail should be adaptable for use in connection with the endless belt type of separators.

It is with these points in mind that the extremely efficient and simple separating and distributing machine, made in accordance with this invention, has been designed.

Conveying belts may be used in lieu of the chutes herein shown without departing from the invention.

Minor objects such as many novel features of specific construction, will appear during the course of the detailed specification referring to the accompanying drawings, wherein but one embodiment of the invention has been illustrated, and wherein, Figure 1 is a side elevation of a separating and distributing machine made in accordance with this invention.

Fig. 2 is a front elevation of the same, parts being broken away for clearness.

Fig. 3 is an enlarged, detailed, fragmentary view of a section of the inclined chute and passages leading therefrom, a portion of the same being in section.

Fig. 4 is an enlarged view of the distributing head showing the unit-carrying nozzle in a position removed from its starting point and in engagement with one of the units to be distributed.

Fig. 5 is a vertical section through the head of the machine taken on line V—V of Fig. 4 looking in the direction of the arrow.

Fig. 6 is an enlarged, fragmentary, detailed view through the telescoping nozzle and air conduit taken on line VI—VI of Fig. 5.

Fig. 7 is an enlarged, fragmentary, detailed view through the clutch actuating arm taken on line VII—VII of Fig. 5.

Fig. 8 is a detailed view taken along section line VIII—VIII of Fig. 2, and,

Fig. 9 is a diagrammatical view of the circuits used in connection with the mechanical parts of the machine.

Figure 1:
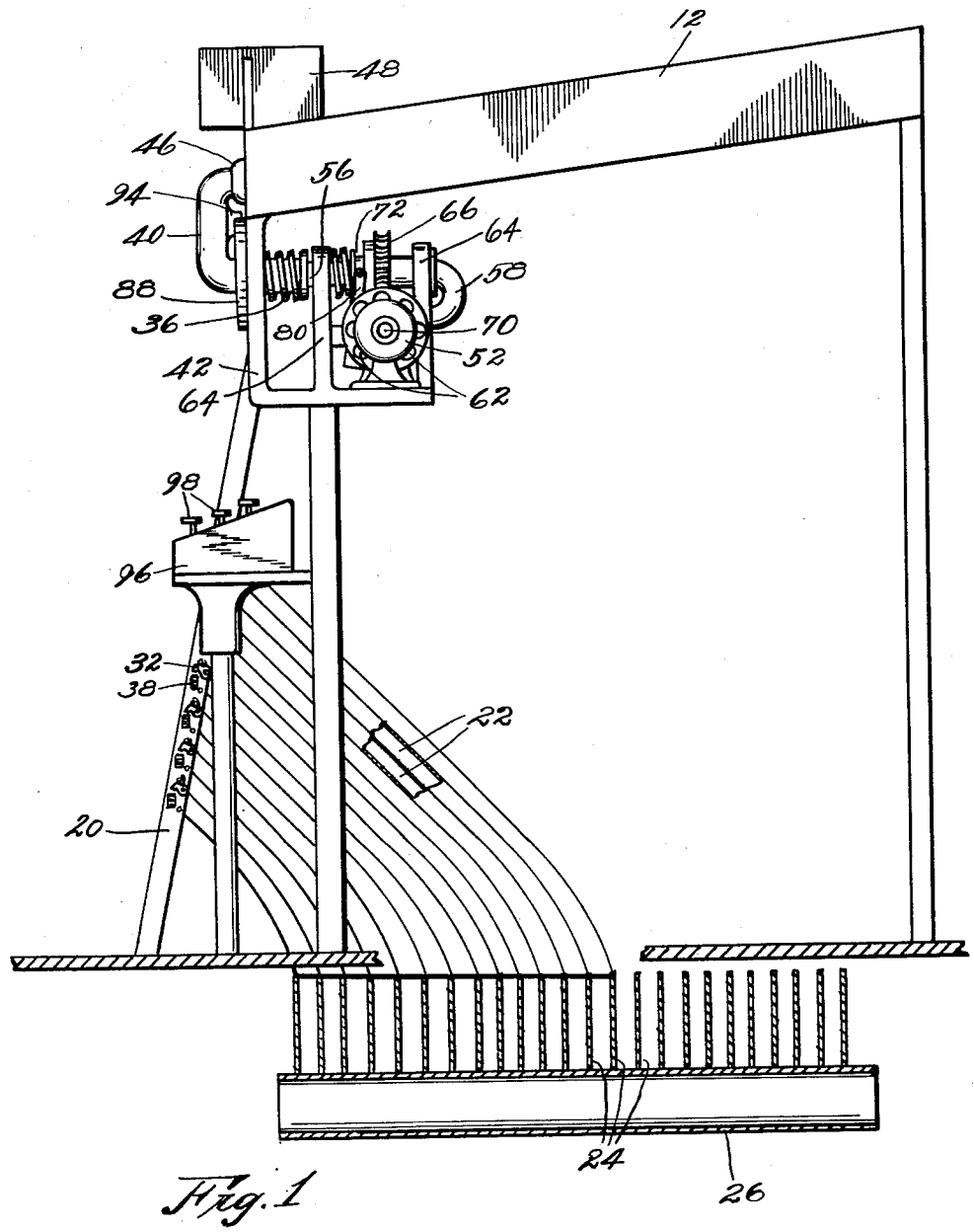

With specific reference to the drawings in detail, wherein like reference numerals refer to similar parts throughout the several views, the number 12 indicates an inclined trough into which is placed, on edge, the units to be separated and distributed, which units may be letters, cards or the like 14, all of which are placed on edge and are fed by gravity to the lowermost end of trough 12 where they stop against flange 16. Each unit 14 as it appears at the forward and lowermost end of trough 12, exposes the address or other designation which appears on its face. This address or designation 18 must be in full view of the operator and only after this designation 18 has been understood, can the operator press the appropriate key of the hereinafter described key board to cause the unit 14 to be carried over into chute 20 where the same is caused to drop by gravity to a point where it is deflected and caused to pass into one of a plurality of passages 22 leading from chute 20 to the separator partitions 24 positioned above an endless conveyor belt 26 which moves the units to appropriate stackers or other suitable places remote from the machine.

When lower edge of unit 14 strikes gate 28, the upper end swings outwardly because of the steep inclination of both chute 20 and gate 28. Thus the lower edge of unit 14 is caused to enter the mouth of passage 22 which has been opened to receive it.

Chute 20 is constructed in a novel manner and passages 22 should join the same along its back as shown in Fig. 3. Each of passages 22 has a gate 28 pivotally supported by the side flanges of chute 20 through the use of stub pintle 30 which extends through the side flange of chute 20 to support arm 32 which normally rests against a stop 34 when the gate 28 is in the closed position. A spring or other yieldable means 36 should be used to maintain the gate in the closed position.

As will be hereinafter more fully described, when referring to the circuit used in connection with the operation of the machine, solenoids 38 should be provided along the side of chute 20 to actuate gates 28 to the open position when the same are energized. A solenoid 38 should be provided for each gate and the strength of the same should be sufficient to open the gate 28 against the action of spring 36. Thus when the unit to be distributed falls along chute 20, the open gate 28 stops its progress along said chute and turns it into the passage 22 as shown in Fig. 3. The closed gates 28 co-act to form the back of chute 20 and the unit 14 passes there-along without obstruction.

In the form of machine shown, the unit 14 is given a one-quarter turn when it is picked up from trough 12 and dropped into chute 20. To mechanically perform this duty and to carry out other objects of the invention, a rotatable nozzle 40 is provided which may be pivotally supported by plate 42 joining trough 12 and chute 20 and having an opening 44 formed therein along a part of the path traveled by the mouth 46 of nozzle 40. Trough 12 terminates in substantially the same plane as the face of chute 20 and the mouth 46 of nozzle 40 intersects both trough and chute 12 and 20 respectively. A suction is created at the mouth 46 of nozzle 40 and the unit 14 is picked up and carried to chute 20 as shown in Fig. 4.

It may be desired to cancel a stamp during this operation. A stamp canceller 48 may be provided for this purpose which lies in the path of travel of unit 14 in such a manner that the rollers 50 thereof may cancel the stamp as the unit 14 passes through the canceller 48.

The means for simultaneously imparting rotary motion to nozzle 40 and creating a suction at the mouth 46 thereof, has been shown in this embodiment to be a motor 52 which drives a suction fan 54 which pulls air in through the mouth 46, through nozzle 40 which is hollow as shown in Fig. 5, through hollow shaft 56 and thence through elbow 58 which leads directly into the fan chamber 60. Exhaust holes 62 should be provided to allow the escape of air. Hollow shaft 56 is supported by members 64 and carries worm gear 66 which is driven by worm 68, carried by motor shaft 70. Worm gear 66 is mounted for free rotation upon shaft 56 and rotary motion is imparted to shaft 56 there-through through the use of clutch 72 which frictionally engages the side of worm gear 66 when spring 74 is allowed to exert its force thereagainst when solenoid 76 is de-energized. Clutch 72 is splined as at 78 to hollow shaft 56 and the clutch arm 80 pivotally mounted as at 82 upon member 64 is pulled against solenoid 76 to compress spring 74 when it is desired to stop the rotation of nozzle 40 which is also splined as at 84 upon shaft 56. Thus motor 52 constantly rotates nozzle 40 so long as solenoid 76 is not receiving current from the circuit of the machine. The lower inturned end of nozzle 40 and hollow shaft 56 are telescoped as shown in Fig. 5 and a spring 86 exerts a yielding inward pressure to maintain nozzle 40 against unit 14 or track 88 whichever the case might be.

Track 88 is an arcuate incline having its lowermost portion at its end 90 and its highest surface with respect to the action upon nozzle 40, at the electrical contact 92, where nozzle 40 always rests to begin its travel with its co-acting contact 94 resting on contact 92. As will be hereinafter described, when a key is depressed, nozzle 40 commences its travel by abruptly jumping off of track 88 to cause a quick contact to be set up between mouth 46 and the unit 14. Thus a positive predetermined relation between nozzle and the unit is maintained, and no sliding movement is permitted between the two elements. As the nozzle 40 rotates in the path indicated by the arrow of Fig. 4, unit 14 is carried and turned one-quarter turn and immediately before the arcuate edge of opening 44 parts unit 14 and mouth 46, track 88 lifts the nozzle to render such action possible and easy. The afore-mentioned telescoping relation of shaft 56 and nozzle 40 and the splined mounting will permit of such action. A keyboard 96 should be positioned in a convenient place so that the operator can depress the appropriate key 98 as he glances at the designation 18 carried by each of the units 14 to be distributed. Each of keys 98, when depressed, actuates apparatus which opens the normally closed circuit controlling the clutch and therefore, the rotation of nozzle 40 and closes a circuit which energizes and de-energizes solenoids 38 to open and close gates 28. To accomplish this, contacts 100 and 102 are forced apart by lug 104 as key 98 is depressed and contacts 106 and 108 are brought together to close the circuit leading to one of solenoids 38. In this manner, if a key 98 is merely pressed down against the force of spring 110 and quickly released, nozzle 40 picks up unit 14 and drops it in chute 20 where the appropriate gate 28 has been opened to receive it.

Assuming that nozzle 40 is in the position of starting which it normally assumes with its contact 94 engaging contact 92 of track 88. Before the key 98 is pressed, clutch 72 is out of engagement with worm gear 66 and, therefore, nozzle 40 is at a standstill. Unit 14 appears and the appropriate key is pressed which parts contacts 100 and 102, and solenoid 76 is de-energized by the opening of the circuit and clutch 72 is thrown in to cause nozzle 40 to be rotated by motor 52. The closed circuit includes the main lines extending from a source of supply and the path of travel of the electrical energy is from line 110 through a main switch 112 to contact 102, through contact 100 to wire 114, to contact point 94 carried by nozzle 40, to contact point 92 carried by track 88, to conductor 116, thence through solenoid 76 to wire 118, to line 120, to the source of supply. Immediately after the circuit just above outlined has been opened by key 98, the gate operating solenoid circuit is closed by contacting points 106 and 108 which allows electrical energy to pass from the source of supply such as a battery 122, to wires 124, through contacts 106 and 108 to conductor 126, solenoid 38 and thence through wire 128 back to battery 122.

It is understood that many modifications may be made in constructing a machine in accordance with this invention without departing from the spirit thereof or the scope of the appended claims.

What is claimed as new and desired to be secured by Letters Patent is:

1. A mail separating and distributing machine comprising an inclined trough, a rotatable nozzle adjacent one end thereof, a delivery chute, a plurality of passages extending from said chute and means to continuously rotate the nozzle in one direction, said nozzle being disposed to have its work engaging mouth intersect both said trough and chute as it rotates continuously in one direction toward and from the work engaging point.

2. A mail separating and distributing machine comprising in combination an inclined trough, a rotatable nozzle adjacent one end thereof, a delivery chute, means for rotating the mouth of said nozzle in but one direction to intersect said trough and chute and common means for rotating said nozzle and creating a suction at the mouth thereof.

3. A mail separating and distributing machine comprising an inclined trough, an inclined chute, a rotatable nozzle disposed to receive units from said trough and deliver the same to said chute, common means for rotating said nozzle and causing an air suction at the mouth thereof, the mouth of said nozzle traveling in a substantially vertical plane to and from the pickup point at the end of said trough and means to cause abrupt movement of the nozzle mouth toward said trough when the mouth of said nozzle reaches the point of pickup as the same continues to rotate.

4. A mail separating and distributing machine comprising an inclined trough, an inclined delivery chute, a rotatable nozzle intersecting said trough and chute adapted to rotate in but one direction, a plurality of passages extending from said chute, a gate for each of said passages and a keyboard having a plurality of manually operable keys and means for moving each of said gates respectively to the open position, said gate opening means being actuated by said keys.

5. In a machine of the character described, an inclined trough, an inclined delivery chute, said trough and chute being positioned to feed matter to be distributed there-along by gravity, a continuously rotating pickup nozzle movable from said trough to said chute, common means for creating a suction at the mouth of said nozzle and for actuating the same to and from the pickup position, a plurality of passages extending from said chute, a gate for each of said passages, and selective means for opening any one of said plurality of gates as movement is caused to be imparted to said nozzle by said common means.

6. In a mail separating and distributing machine, an inclined trough adapted to receive mail units to be distributed and feed the same by gravity to one end thereof, a delivery chute inclined to cause mail units to travel by gravity there-along, a suction nozzle movable to transfer mail units from said trough to the chute, common means for actuating said nozzle and providing a suction at the mouth thereof, and a supporting plate for said nozzle positioned between said nozzle and said mail units and having a slot therein positioned in the path of travel of the mouth of said nozzle whereby the nozzle is positioned to grip a mail unit and a portion of said supporting plate being so positioned as to engage said mail unit to hold it against the suction pull of the nozzle and release the same into said delivery chute.

7. In a mail separating and distributing machine of the character described, a trough, a delivery chute, a rotatable nozzle positioned to transfer units to be distributed from said trough to said chute, and means for moving said nozzle transversely to its direction of rotation as rotation is being imparted thereto.

8. In a mail separating and distributing machine, a pair of mail receiving members, a plate joining said members, a mail engaging nozzle mounted for movement from one of said members to the other, said plate having an opening formed there-through in the path of travel of said nozzle whereby said nozzle is permitted to engage the mail as the same is moving along but a portion of its path of travel.

9. In a mail separating and distributing machine, a rotatable pickup nozzle, common means for imparting continuous one way rotation to said nozzle and causing air suction at the mouth thereof and manually operable means for connecting and disconnecting said nozzle with said common means whereby said nozzle is caused to rotate or become stationary as suction is constantly created by the said common means.

10. In a mail separating and distributing machine, a pair of mail receiving members, one of said members having a plurality of passages leading therefrom, a gate for each of said passages, means yieldably maintaining each of said gates in the closed position, a solenoid adjacent each gate respectively to move the same to the open position when the same is energized, a key board having a plurality of key operated switches and conductors joining each of said keys respectively with a gate operating solenoid, whereby, when mail to be distributed enters said mail receiving member, the appropriate gate may be opened to deflect its travel to a predetermined passage by actuating a key of said key board.

11. In a mail separating and distributing machine, an inclined chute positioned to permit mail units to pass by gravity there-along, a plurality of passages leading from said chute, a gate for each passage respectively, each of said gates being yieldably maintained in the passage closing position and a solenoid positioned adjacent each gate to move the same to the open position in the path of travel of said mail unit when the same is energized.

12. In a mail separating and distributing machine, a pair of mail carrying members, a rotatable nozzle, a motor to operate said nozzle, a clutch to make and break connection between said nozzle and motor, a solenoid to move said clutch to and from the making and breaking positions respectively, a plurality of gates carried by one of said mail carrying members, a solenoid to open each of said gates respectively, a key board having a plurality of key operated switches, an electrical contact in the path of travel of said nozzle, an electrical contact carried by said nozzle, said contacts being together to complete a circuit when said nozzle is in the starting position, each key of said key board being adapted to open the circuit whereby said clutch is moved to cause the motor to rotate said nozzle and to simultaneously close the circuit energizing one of the solenoids to open the gate associated therewith whereby the mail unit to be distributed is carried from one of said mail carrying members to the other and thence through the open gate to one of said plurality of passages.

13. In a mail separating and distributing machine of the character described, a pair of mail carrying members, a rotatable nozzle, common means for imparting rotation to said nozzle and for creating a suction at the mouth thereof including telescoping tubular members, a motor, a clutch adapted to connect and disconnect said nozzle from said motor, a keyboard having a plurality of key operated switches, a contact formed by said nozzle as the same is in the starting position, a solenoid to move said clutch out of engagement, to disconnect said motor from the nozzle, a spring member to move said clutch to connect said motor and said nozzle, said switches being movable to the open position by any of the keys of said keyboard, whereby said clutch operating solenoid is deenergized to permit the actuation of said spring, to permit the movement of said nozzle from its contacted position whereby said nozzle is caused to be rotated by the motor in uninterrupted succession as long as either of said keys are depressed.

In testimony whereof, I hereunto affix my signature.

DICK G. WERNER.